United States Patent

Hapke et al.

[11] Patent Number: 5,728,985
[45] Date of Patent: *Mar. 17, 1998

[54] WASHING MACHINE LID SWITCH ASSEMBLY

[75] Inventors: Kenyon A. Hapke, Libertyville, Ill.; Spencer C. Schantz, Dousman, Wis.

[73] Assignee: U.S. Controls Corporation, New Berlin, Wis.

[*] Notice: The term of this patent shall not extend beyond the expiration date of Pat. No. 5,600,967.

[21] Appl. No.: 752,922

[22] Filed: Nov. 20, 1996

Related U.S. Application Data

[62] Division of Ser. No. 425,760, Apr. 20, 1995, Pat. No. 5,600,976.
[51] Int. Cl.$^6$ ........................................ H01H 3/16
[52] U.S. Cl. .................. 200/61.62; 68/12.26; 192/136; 200/61.7; 292/DIG. 69
[58] Field of Search ........................ 200/61.62–61.7, 200/61.71–61.83; 68/12.26; 192/136; 292/DIG. 69

[56] References Cited

U.S. PATENT DOCUMENTS

| | | | |
|---|---|---|---|
| 3,272,935 | 9/1966 | Beller et al. | 200/61.7 |
| 3,440,373 | 4/1969 | Blewitt, Jr. | 200/61.7 |
| 3,504,777 | 4/1970 | Waugh | 200/61.7 X |
| 3,997,751 | 12/1976 | McNally | 200/61.7 |
| 5,600,976 | 2/1997 | Hapke et al. | 68/12.26 |

*Primary Examiner*—J. R. Scott
*Attorney, Agent, or Firm*—Quarles & Brady

[57] ABSTRACT

A lid switch for disabling a top loading washing machine when the lid is raised is provided in which an arcuate arm passing downward from the lid near the hinge of the lid curves around the hinge axis into a space behind the lid under the top surface of the washing machine. A switch positioned above this top surface and having a downwardly extending operator may be actuated by this arm, the arm which serves to trap water from the washing machine tub area and by passing through a rim extending downward into the tub resists tampering with the switch. In one embodiment, the arcuate arm strikes a rocker arm permitting further displacement of the switch away from the tub. The rocker arm may be in two halves which pivot with respect to each other held in angular relationship by a detent. The switch assembly may be made self-adjusting by bending this adjustable rocker arm to small angle allowing the detent to release under the force of the arcuate arm after the switch has reached its stop position adjusting the rocker arm to the correct angular configuration.

2 Claims, 4 Drawing Sheets

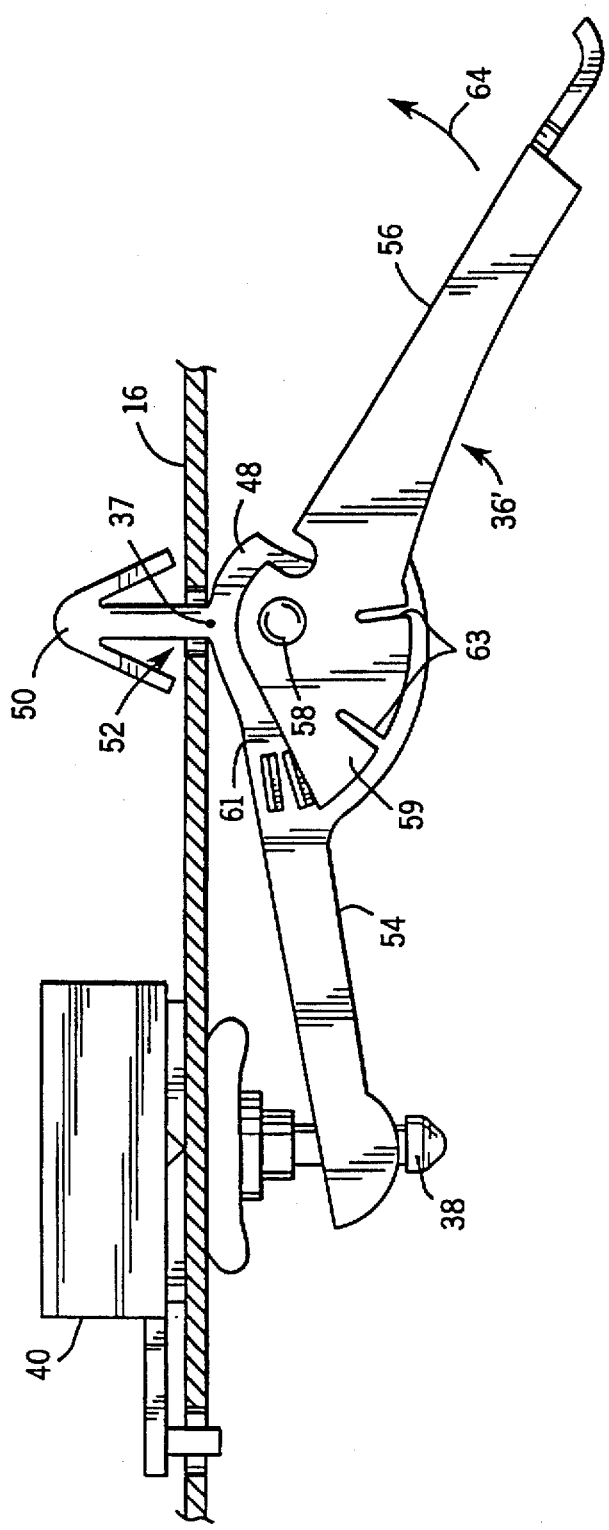
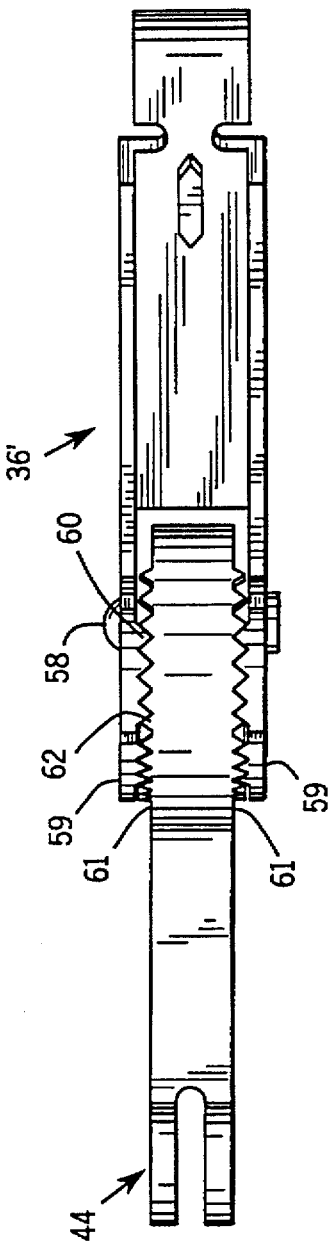
FIG. 6
FIG. 7

WASHING MACHINE LID SWITCH ASSEMBLY

This is a division of application Ser. No. 08/425,760 filed Apr. 20, 1995 now U.S. Pat. No. 5,600,976.

FIELD OF THE INVENTION

The present invention relates to electrical switch assemblies used with residential clothes washing machines and the like to stop the operation of the machine when the lid is raised. Specifically, the invention relates to a switch assembly which resists tampering and reduces the possibility of contamination of the electrical contacts of the switch by water, soap or lint.

BACKGROUND OF THE INVENTION

Top loading residential washing machines provide an upwardly open tub into which clothes and detergent may be placed for cleaning. During operation, the tub and its internal spin basket are filled with water, via a solenoid valve, and a central agitator within the tub agitates the clothes and the water to separate the dirt from the fabric (the "agitation cycle"). At the conclusion of the agitation cycle, the water is drained from the tub and the spin basket is spun about its axis to remove the water from the wet clothes by centrifugal force (the "spin cycle").

During the spin cycle, it is important that the tub be covered to prevent injury to the user. For this reason, a hinged lid is provided to cover the opening of the tub during operation of the washing machine. The lid may be connected to an electrical switch (a "lid switch") so that if the lid is opened during the agitation or spin cycles, the washing machine stops.

It is known to position the lid switch on the underside of the top of the washing machine in an area underneath the lid when the lid is closed. A pin extending downward from the lid activates the lid switch, when the lid is closed, to permit operation of the washing machine.

The maximum sensitivity of the lid switch is obtained by positioning the lid switch beneath the front edge of the lid furthest from the lid's hinge. In this position, a pin attached to the lid for activating the lid switch, will have the greatest possible motion when the lid is lifted.

Unfortunately, in this position, the lid switch is particularly vulnerable to water and detergent splash. Further, because the switch is readily apparent, the risk of it being defeated with a pencil or other pointed instrument (so as to operate the washing machine while the lid is open) is increased.

These problems can be avoided somewhat by moving the switch to a position closer to the hinge. However, in this position, the reduced motion of the lid makes it difficult to provide switching during the early stages of opening the lid because of the lack of travel close to the hinge point.

SUMMARY OF THE INVENTION

The present invention provides a lid switch assembly that resists tampering and that minimizes exposure of the switch to contamination. This is accomplished, in a first embodiment, by means of an arcuate arm positioned near the hinge of the lid to curve downward away from the lid and upward about the hinge axis. Motion of the arm with the lid arm actuates a downward extending operator of a switch behind the wall.

More specifically, the present invention provides a switch assembly including an arcuate arm attached to a first end of the lid and extending downward therefrom about the hinge axis to a second end, and a switch having a contact assembly linked with a downward extending operator. The operator is positioned with respect to the hinge so as to be pushed upward by the second end of the arcuate arm when the lid is in the closed position and so that the operator returns downward when the lid is in the open position.

It is one object of the invention to provide an improved lid switch assembly for top loading washing machines and the like having improved resistance to contamination from water, soap and lint. The arcuate shape of the arm provides a trap against passage of water from the lid area to the switch. This is furthered by mounting the switch in inverted configuration so that the switch contacts are above the operator actuated by the arm. The arm also provides a lever to increase the movement of the switch operator as the lid is opened, increasing the sensitivity of the switch to the opening lid and allowing the switch to be removed from the immediate area of the tub.

The arcuate arm may pass through a slot in the top rim for a length which has a constant radius about the hinge axis. The opening of the slot may conform substantially to the cross section of the arcuate arm.

Thus, it is another object of the invention to provide a lid switch assembly that resists tampering. The slot may be relatively narrow and may be fully occupied by the arcuate arm preventing the user from inserting a tool through the slot to defeat the switch. Further, because the path of the arcuate arm curves, a straight tool inserted in the slot will not properly locate the operator of the switch.

A rocker arm may be interposed between the arcuate arm and the operator of the switch to permit the switch to be moved further away from the tub area. The rocker arm may have a first and second end separated by a fulcrum point and be positioned with respect to the lid hinge so that the first end of the rocker arm is pushed upward by the second end of the arcuate arm when the lid is in the closed position and so that the first end of the rocker arm may return downward when the lid is in the open position. The operator may be pivotally linked to the second end of the rocker arm so as to be pulled downward by the second end to a stop point when the lid is in the closed position and so as to retract upward when the lid is in the open position.

It is therefore another object of the invention to permit the switch to be further removed from the tub area.

The rocker arm may include a barbed projection extending upward from the fulcrum point to be received within a hole in the top of the washing machine to loosely suspend the rocker arm from the top so that it may pivot about the fulcrum point. The rocker arm may be a single piece plastic part. The second end of the rocker arm may be forked to receive a notched operator.

Thus it is another object of the invention to provide a means for interconnecting the arcuate arm and the switch that is both inexpensive and that allows the arm to be easily installed. The barbed projection, once inserted within the hole in the top, locks itself in place and provides the necessary freedom of motion to rock under the influence of the arcuate arm. The forked end of the rocker arm and notched operator allow the two to be quickly connected thus holding the rocker arm in alignment without the need for a separate hinge assembly.

The rocker arm may include a first and second rocker arm half providing the first and second ends respectively and joined pivotally with respect to each other at the fulcrum point. A detent between the first and second rocker arm halves may permit pivoting of the first and second rocker arms with respect to each other but only for forces greater than that required to pull the operator downward to the stop point.

Therefore, it is another object of the invention to provide for a self-adjusting lid switch. Prior to assembly, the first and second rocker arm halves are adjusted to a greater angle than is required during operation. The first time the lid is closed, the arcuate arm engages the first end of the rocker arm moving the operator of the switch downward until it reaches the stop. At that point, the detent releases allowing the rocker arm first and second halves to pivot with respect to each other to provide an automatic adjustment of their angle to the particular assembly.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention however, and reference must be made therefore to the claims herein for interpreting the scope of the invention.

BRIEF DESCRIPTION OF THE DRAWINGS

FIG. 6 is a side elevation view of a second embodiment of the rocker arm of FIG. 3 providing self-adjustment of the switch assembly;

FIG. 7 is a bottom view of the rocker arm of FIG. 6 showing the detent between halves of the rocker arm;

DETAILED DESCRIPTION OF THE PREFERRED EMBODIMENT

Figure 1:
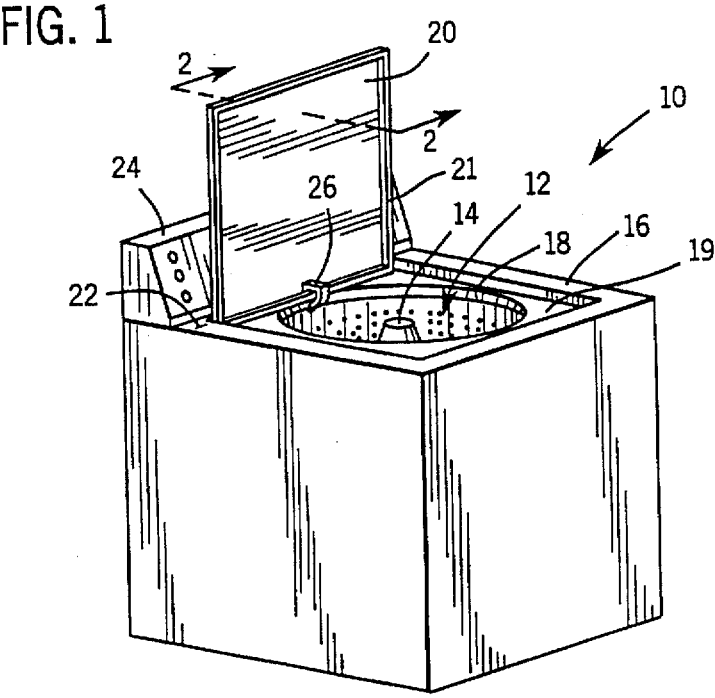
FIG. 1 is a perspective view of a top loading residential washing machine having a rear console and showing a lid in an open position to reveal the arcuate arm of the preset invention.

Referring now to FIG. 1, a top loading washing machine 10 provides generally a tub 12 into which clothes may be loaded and washed under the influence of center agitator 14. Access to the tub 12 is provided through a circular opening in a generally planar and horizontal top 16. The circular opening conforms substantially to the opening of the tub 12 and is ringed by a top flange 18 extending downward from the circular opening a short distance into the tub 12 to guide clothes into the tub 12.

A square lid 20 may be closed to a horizontal position abutting the top 16 within a shallow recess 19 formed in the top 16. The recess 19 is equal in area to the lid 20 so that the lid 20 may be closed to lie within the recess 19 flush with the top 16. Water dripping from wet clothes removed from the tub 12 to the top 16 will be largely collected by the recess 19. The lid 20 includes a downwardly extending lip 21 providing the lid 20 with additional stiffness and a finished edge.

The lid 20 may open to a substantially vertical orientation by means of a hinge (not shown) rotating one edge of the lid 20 about a hinge axis 22 along a rear edge of the lid 20. A console 24 supporting the controls of the washing machine 10 is positioned at the rear edge of the top 16 of the washing machine 10 behind the lid 20 when it is open.

Figure 2:
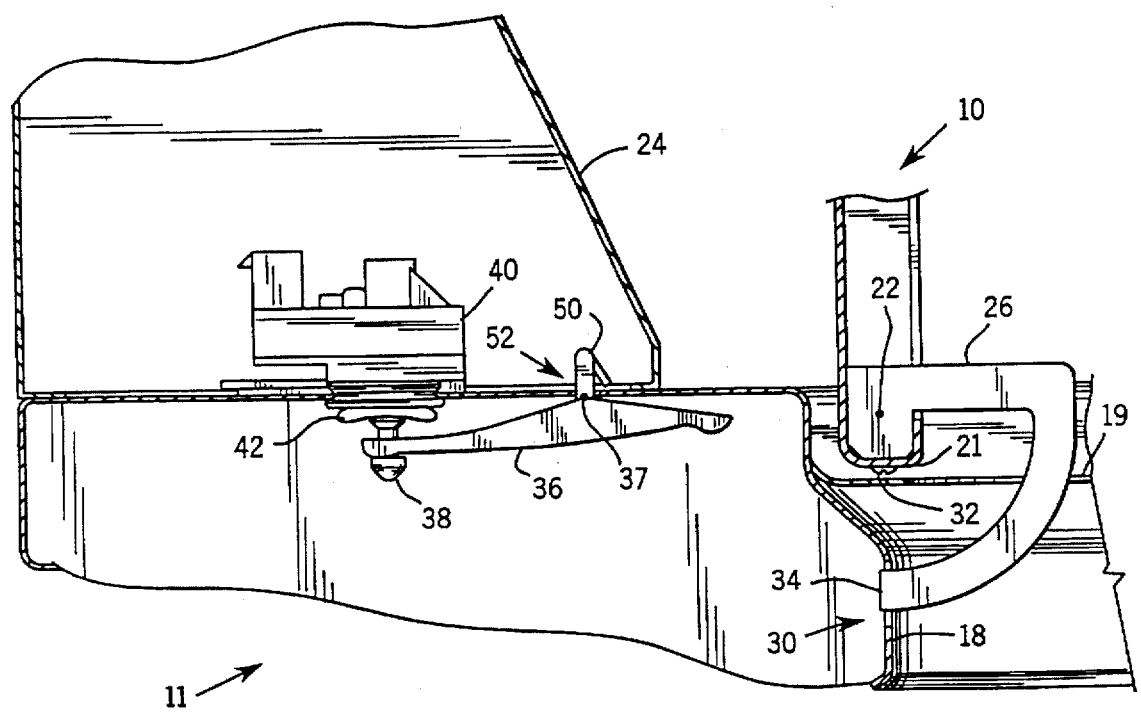
FIG. 2 is a cross section along lines 2—2 of FIG. 1 showing the arcuate arm positioned to pass through a slot in the top rim to push a rocker arm attached to a switch within the console.

Referring now to FIGS. 1 and 2, a switch assembly 11 includes an arcuate arm 26 attached to the underside of the lid 20 near the hinge axis 22 and centered along the rear edge of the lid 20. The arcuate arm 26 extends downward from the lid 20 when the lid 20 is in the closed position and generally curves rearward about the hinge axis 22 to pass through a slot 30 in the top flange 18 as the lid 20 is opened and closed. The arcuate arm 26 may be constructed from an injection molded plastic to provide a generally rectangular cross section conforming to the outline of the slot 30 and secured to the lid 20 by a screw 32 passing through the lip 21 of the lid 20 and into the arcuate arm 26. The screw 32 may be inserted through the lip 21 prior to assembly of the lid 20 to the washing machine 10 to be inaccessible to the user in normal use.

Figure 3:
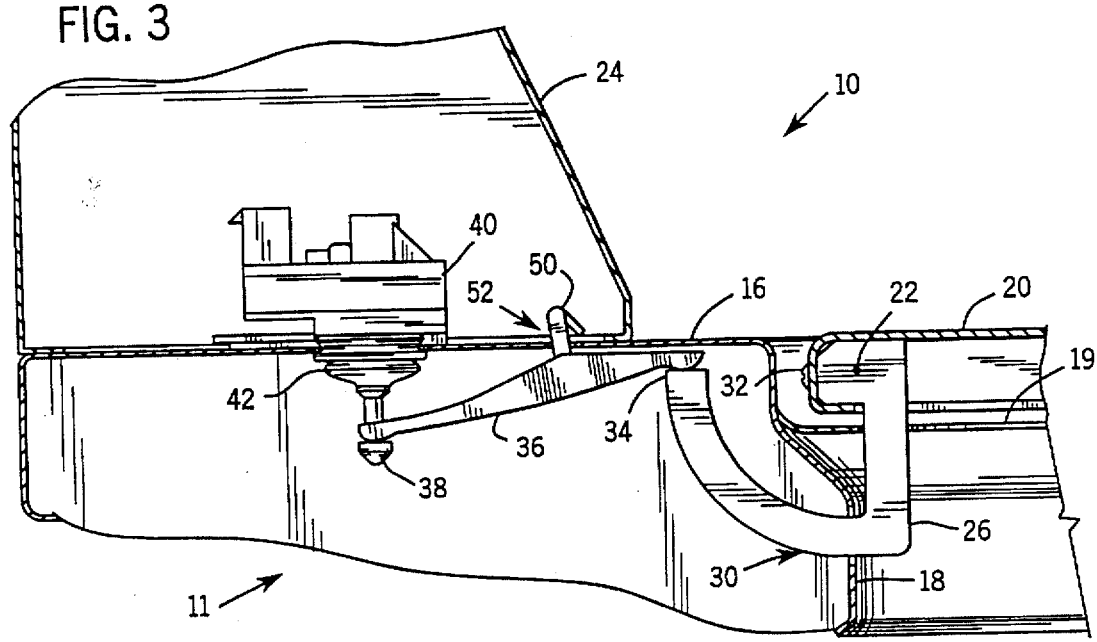
FIG. 3 is a figure similar to that of FIG. 2 but showing the lid in the closed position.
Figure 4:
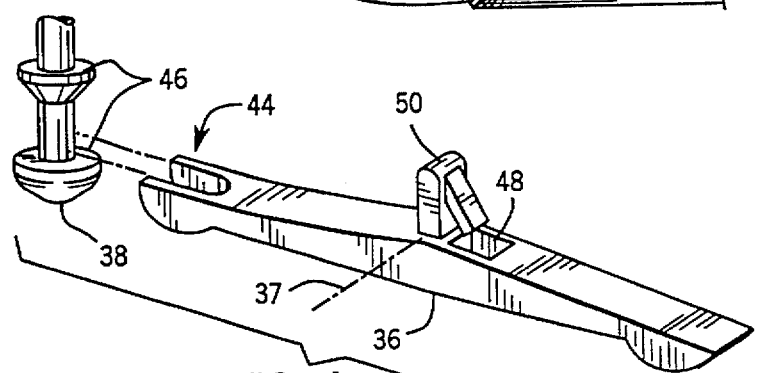
FIG. 4 is a perspective view of the rocker arm of FIG. 3 as may be molded in a single piece plastic part.

Referring now to FIGS. 3 and 4, when the lid 20 is in the closed position, a free end 34 of the arcuate arm 26 passes through the slot 30 and moves upward to approach a point proximate to the underside of the top 16 of the washing machine 10 and to push against a first end of a rocker arm 36 upward causing a second end of the rocker arm 36 to move downward about a rocker arm axis 37. The second end of the rocker arm 36 is attached to the switch operator 38 of a switch 40 pulling the operator down to close a set of electrical contacts (not shown) within the switch 40. These contacts are typically wired in series with the washing machine motor to prevent agitation or spin drying of the clothes when the lid is open.

In operation, the rocker arm 36 presses against the underside of the top 16 at a ridge fulcrum 48 at the middle top of the rocker arm 36. The rocker arm is held to the top 16 by means of a barbed projection 50 passing upward from the fulcrum 48 through a hole 52 in the top 16. The barbed projection 50 is forced through the hole 52 by compressing its barb inward against the body of the barbed projection 50. After the barbed projection 50 is so inserted, the barb may spring outward, as a result of the natural elasticity of the material of the barbed projection 50, locking the rocker arm 36 in position.

Figure 9:
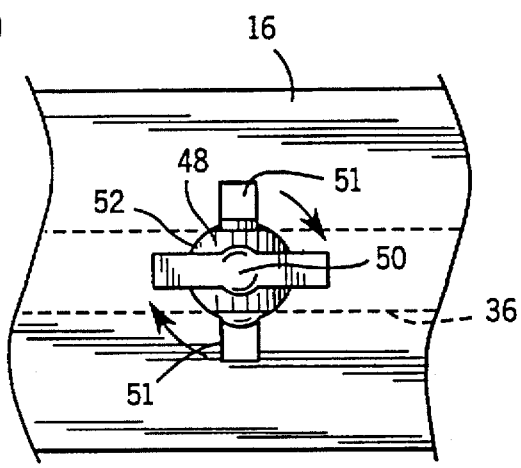
FIG. 9 is a top view of the rocker arm of FIGS. 4, 6 and 7 from above the top of the washing machine showing a keyhole through which a barbed projection of the rocker arm may be inserted.

Alternatively, as shown in FIG. 9, the hole 52 may be cut in a "keyhole" shape having side slots 51 opposed across the center of the hole 52 to permit passage of the barbs of the barbed projection 50 into the hole 52 without deflection of the barbs, when the rocker arm 36 and hence the barbed projection, is rotated to a first position about its axis of insertion into hole 52. Rotation of the rocker arm 36 by 90° then locks the rocker arm 36 to the top 16.

In the preferred embodiment, the hole 52 in the top 16, used to attach the rocker arm 36 to the top 16, is positioned beneath the console 24 so as to be removed from access by the user and somewhat protected from splashing and contamination. The hole 52 is somewhat larger than the barbed projection 50 so as not to interfere with a rocking back and forth of the rocker arm 36.

The second end of the rocker arm 36 co-acts with the switch operator 38 by means of a fork 44 which fits around the cylindrical switch operator 38 within a notch formed between two cylindrical collars 46. Thus, assembly of the rocker arm 36 to the washing machine 10 requires no more than a fitting of the fork 44 onto the switch operator 38 and pressing the barbed projection 50 through the hole 52. Together the barbed projection 50 and the interfitting of the fork 44 and switch operator 38 hold the rocker arm 36 against rotation about the barbed projection 50 to ensure alignment of the rocker arm 36 and the free end 34 of the arcuate arm 26, but yet permit rocking action under the influence of the arcuate arm 26.

The entire rocker arm, including the barbed projection 50, may be advantageously molded in a single piece from plastic.

Referring again to FIGS. 2 and 4, the switch operator 38 of the switch 40 passes out of the body of the switch through a flexible bellows 42, the latter of which serves to further seal contaminants, including water, out of the switch 40. The switch 40 incorporates an internal spring to retract the switch operator 38 and open the internal contacts absent force downward on the operator by the rocker arm 36. Thus, when the lid 20 is in the open position as shown in FIG. 2, with the end 34 of the arcuate arm removed from the rocker arm 36, the switch operator 38 retracts upward opening the contacts and stopping operation of the washing machine motor.

The mounting of the switch 40 is such that the contacts within the body of the switch are generally above the top 16 of the washing machine 10 with the operator extending downward out from the body of the switch 40 and through a hole in the top 16 to a position beneath the top 16. Thus the mounting of the switch 40 is such that gravity-induced drainage is in a direction opposing contamination of the switch 40 by water and the like from the tub of the washing machine 10. Further, it will be noted that, in the closed position of the lid 20, the arcuate arm 26 provides a U-shaped trap for water splashed from the tub area, which as a result of the U-shape cannot flow upward to the rocker arm 36. The small size of the slot 30 in the top flange 18 also provides a barrier to the contamination of the switch 40.

It will be appreciated also that the slot 30, as is normally obstructed by the arcuate arm 26, renders it difficult for the user to tamper with the switch 40 by passing instruments through the slot 30.

Referring now to FIGS. 6 and 7, the switch assembly 11 of FIGS. 2 and 3 may be made self-adjusting by the use of a rocker arm 36' composed of a first and second rocker arm half, 54 and 56 respectively, pivoted near a ridge fulcrum 48 about a rivet 58 to move between a first and second configuration. The first rocker arm half 54 includes the fork 44, which may interfit with the switch operator 38 of the switch 40, and the barbed projection 50 attaching the rocker arm 36 to the top 16. This rocker arm half 54 may be advantageously molded in a single piece from thermoplastic material.

The second rocker arm half 56 may be fabricated from sheet stainless steel folded into a shallow channel cross-section with wings 59 to embrace the right and left sides 61 of the first rocker arm half 54 and to be pivotally held in place by the rivet 58. As is best seen in FIG. 7, the inner surface of the wings 59 of the second rocker arm half 56 includes a set of inwardly projecting teeth 60 which engage corresponding outwardly extending teeth 62 formed in the left and right sides 61 of the first rocker arm half 54 where it is overlapped by the second rocker arm half 56.

Pivoting motion of the first rocker arm half 54 with respect to the second rocker arm half 56 about the rivet 58 is resisted by the teeth 60 and 62 forming detent surfaces until the force between the rocker arm halves 54 and 56, in the form of a torque about the rivet 58 is sufficient to resiliently deflect the wings 59 of the rocker arm half 56 outward permitting teeth 60 to pass by teeth 62. The torque necessary to permit pivoting motion of the first rocker arm half 54 with respect to the second rocker arm half 56 about the rivet 58 is set to be greater than that necessary to actuate switch 40. Alternatively, the teeth may be replaced with a pair of contacting frictional surfaces providing the same controlled pivoting.

The first and second halves 54 and 56 of the rocker arm 36' are initially positioned so that the angular relationship measured between the first and second rocker arm halves 54 and 56, from the bottom side of the rocker arm 36', is less than that which would be expected during normal operation of the switch assembly 11. When the free end 34 of arcuate arm 26 presses on the end of the second half of the rocker arm 36', forcing that end upward as indicated by arrow 64, the opposite end of the rocker arm 36', of rocker arm half 54, attached to switch operator 38, moves switch operator 38 downward until a mechanical stop position of the switch 40 is reached. At this point, the torque about rivet 58 between the first and second rocker arm halves 54 and 56 increases to a predetermined point that permits slippage of the detent surfaces of teeth 60 and 62 past each other to accommodate additional travel of the free end 34 of the arcuate arm 26. The pivoting of the first rocker arm half 54 with respect to the second rocker arm half 56 about the rivet 58 sets the precise angle between the first and second halves of the rocker arm 36 required for full extension of the switch operator 38 with closure of the lid 20. This precise adjustment aids in providing rapid turnoff of the motors of the washing machine 10 with small angular opening of the lid 20.

The amount the lid 20 must be opened to turn off the motor of the washing machine 10 will be equal to the distance the switch operator 38 moves upward between full extension (at the stop position) and a switch point position a small amount above the stop position, multiplied by the lever ratio provided by the arcuate arm 26 and the rocker arm 36.

The torque required for pivoting motion of the first rocker arm half 54 with respect to the second rocker arm half 56 about the rivet 58 may be set by selection of the material and gauge of the second rocker arm (and hence the flexibility of the wings 59), the size and number of the teeth 60 and 62, and the closeness of the fit between the first rocker arm half 54 and the second rocker arm half 56. Slots 63 permit fine tuning of the effective flexibility of the wings 59.

Figure 5:
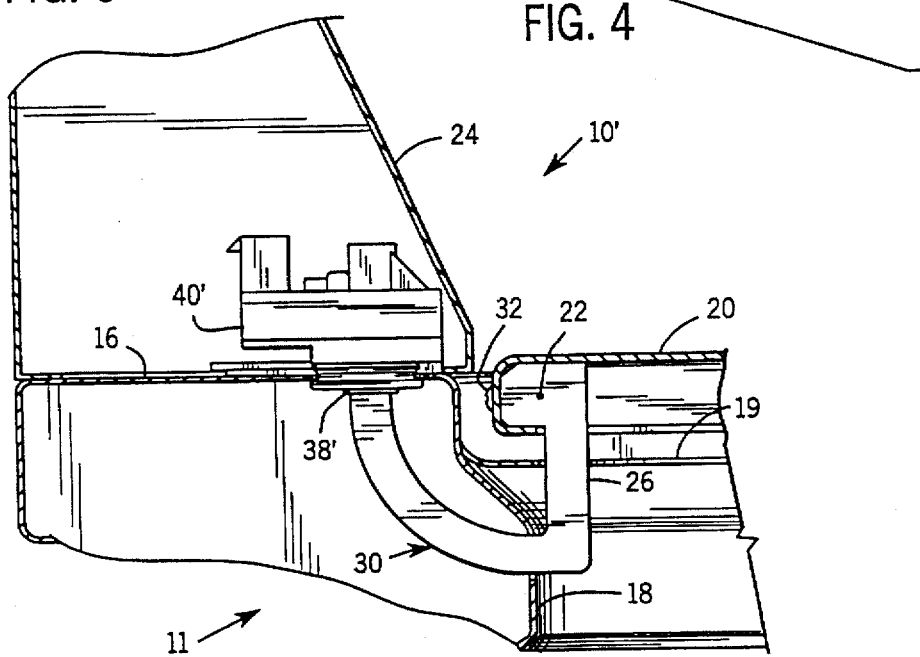
FIG. 5 is an alternative embodiment of the present invention without the rocker arm and with the switch moved to a position closely adjacent to the lid.

Referring now to FIG. 5, in some models of washing machine 10', the console may more closely abut the recess 19 holding the lid 20, so that the rocker arm 36 may be dispensed with and the arcuate arm 26 may act upon the switch operator 38' of the switch 40'. Here the switch 40' closes its contacts with upward motion of the switch operator 38 in contrast to the switch 40 described with respect to FIGS. 2 and 3. Again the features of tamper resistance and reduction of contamination of water, soap, and lint from the tub is provided by the arcuate arm 26.

Figure 8:
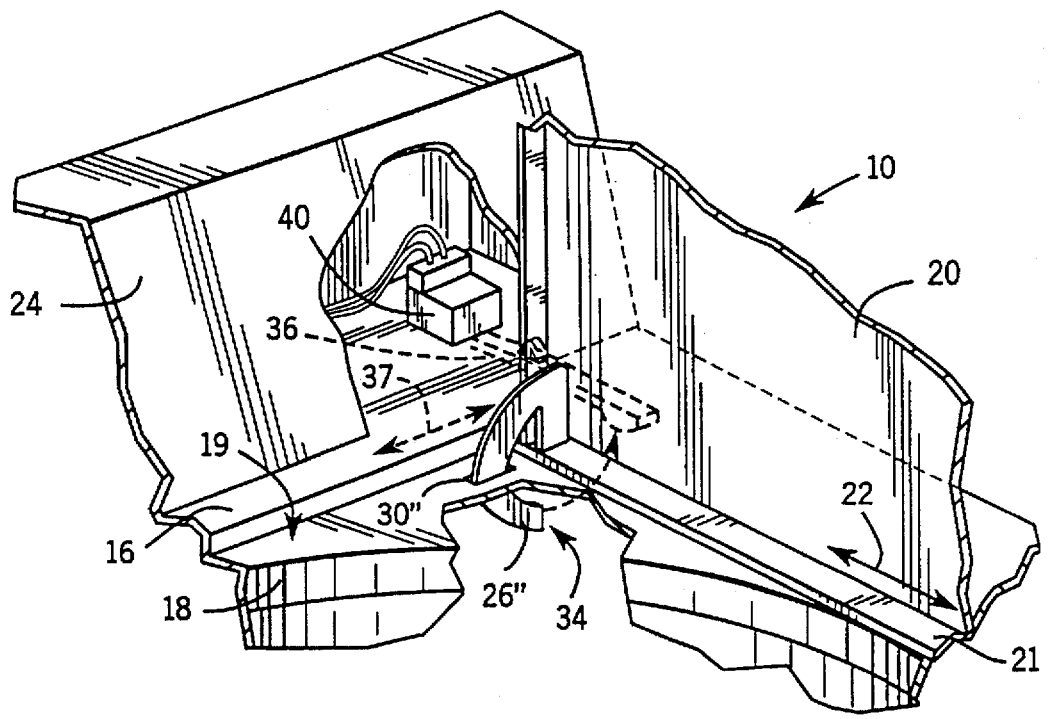
FIG. 8 is a fragmentary, perspective view of the top loading washing machine of FIG. 1 showing the lid mounted to open to the side of the washing machine and with a rocker arm axis perpendicular to the hinge axis.

Referring now to FIG. 8, the lid 20 may open to one side of the washing machine 10 so that the hinge axis 22 lies generally along a right side of the top 16. In this case, the arcuate arm 26", as attached to the underside of the lid 20, is displaced to the rear edge of the lid 20 and extends downward through a slot 30" in a horizontal surface of the bottom of the recess 19. For this reason, the arcuate arm 26" maintains a constant radius about the hinge axis 22 starting at the point where it first extends downward from the bottom surface of the lid 20.

When the lid 20 is in the closed position, the free end 34 of the arcuate arm 26" approaches a point beneath the top 16 to the right side of the washing machine 10 to push upward against the first end of the rocker arm 36 which is now displaced to the right side of the washing machine 10. As before, the other end of the rocker arm 36 attaches to a switch 40 positioned under the console 24. In this case, the rocker arm axis 37 is perpendicular to the hinge axis 22.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. A method of adjusting a switch assembly for a top-loading washing machine or the like, the washing machine having a lid hinged at one edge to move about a hinge axis between a closed position with the lid substantially aligned with the top surface of the washing machine and an open position where an edge of the lid opposite the hinged edge is raised with respect to its position when the lid is closed, the switch assembly including: (a) a switch having a contact assembly linked with an operator, the operator having a switch point position where contacts of the switch are actuated, and a mechanical stop position beyond which the operator does not move, the operator moving a known distance between the stop position and switch point position; (b) an adjustment element having a first and second configuration providing a mechanical linkage between the switch operator and the lid to move the operator with movement of the lid, the adjustment element moving from the first to the second configuration only at a predetermined release force, the first configuration providing earlier movement of the operator as the lid is closed than the second configuration, the method comprising the steps of:

(i) setting the adjustment element to the first configuration;

(ii) moving the lid from the open position to move the operator to the stop position without applying a force on the adjustment element greater than the predetermined release force;

(iii) closing the lid to apply a force on the adjustment element greater than the predetermined release force to move the adjustment element to the second configuration with the operator remaining in the stop position;

whereby the contacts are activated when the lid is next opened by a predetermined amount determined by the known distance the operator moves between the stop position and switch point position.

2. A method of adjusting a switch assembly for an access door hinged at one edge to move about a hinge axis between a closed position and an open position, the switch assembly including: (a) a switch having a contact assembly linked with an operator, the operator having a switch point position where contacts of the switch are actuated, and a stop position, the operator moving a known distance between the stop position and switch point position; (b) an adjustment element having a first and second configuration providing a mechanical linkage between the switch operator and the door to move the operator with movement of the door, the first configuration providing earlier movement of the operator as the door is closed than the second configuration, the method comprising the steps of:

(i) setting the adjustment element to the first configuration;

(ii) moving the access door from the open position to move the operator to the stop position;

(iii) closing the access door to move the adjustment element to the second configuration with the operator remaining in the stop position;

whereby the contacts are activated when the access door is next opened by a predetermined amount determined by the known distance the operator moves between the stop position and switch point position.

* * * * *